(12) United States Patent
Bragg

(10) Patent No.: US 12,498,983 B2
(45) Date of Patent: Dec. 16, 2025

(54) TRACKING OF CONTINUOUS DATA PROCESSING WORKLOADS

(71) Applicant: Microsoft Technology Licensing, LLC, Redmond, WA (US)

(72) Inventor: Scott Michael Bragg, Snoqualmie, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 651 days.

(21) Appl. No.: 17/824,217

(22) Filed: May 25, 2022

(65) Prior Publication Data

US 2023/0385119 A1 Nov. 30, 2023

(51) Int. Cl.
*G06F 9/50* (2006.01)
*G06F 9/38* (2018.01)

(52) U.S. Cl.
CPC ............ *G06F 9/505* (2013.01); *G06F 9/3836* (2013.01); *G06F 9/5038* (2013.01)

(58) Field of Classification Search
None
See application file for complete search history.

(56) References Cited

U.S. PATENT DOCUMENTS

| | | | | |
|---|---|---|---|---|
| 6,907,461 B2 * | 6/2005 | Ishmael, Jr. | ............ | G06F 9/505 709/224 |
| 7,082,604 B2 * | 7/2006 | Schneiderman | ........ | G06F 9/505 709/224 |
| 7,346,906 B2 * | 3/2008 | Kelly | .................. | G06F 11/3466 707/999.001 |
| 10,097,571 B2 * | 10/2018 | Bower, III | .............. | H04L 41/28 |
| 10,237,335 B2 * | 3/2019 | Piga | ......................... | H04L 67/10 |
| 10,776,013 B2 * | 9/2020 | Gupta | .................... | G06F 3/0689 |
| 11,663,250 B2 * | 5/2023 | Raju | ...................... | G06N 3/044 704/270 |
| 2005/0144305 A1 * | 6/2005 | Fegan, II | .............. | H04L 65/762 709/231 |
| 2007/0143169 A1 * | 6/2007 | Grant | ............. | G06Q 10/063112 705/7.14 |
| 2013/0162661 A1 * | 6/2013 | Bolz | ......................... | G06T 1/20 345/522 |
| 2017/0300361 A1 * | 10/2017 | Lanka | .................... | G06F 9/4881 |
| 2021/0182324 A1 | 6/2021 | Raju | | |

OTHER PUBLICATIONS

"International Search Report and Written Opinion Issued in PCT Application No. PCT/US23/020096", Mailed Date: Jul. 25, 2023, 13 Pages.

* cited by examiner

*Primary Examiner* — Van H Nguyen
(74) *Attorney, Agent, or Firm* — Barta Jones, PLLC

(57) ABSTRACT

A stream of continuous data processing commands or workloads may be tracked for completeness. A stream of signals is received that includes a plurality of commands to be executed. At least one timeslice is generated in the received stream which corresponds to a period of time and includes the plurality of commands received in the period of time. The plurality of commands is categorized into at least one page and a unique identifier is assigned to the at least one page. The at least one page, including the unique identifier, is transmitted to a command executing agent and in response to receiving an indication that the at least one page is completed, each of the plurality of commands included in the at least one page is marked as completed.

20 Claims, 10 Drawing Sheets

| PageId | Count | PageRank | Asset-Page Rank | Delta |
|---|---|---|---|---|
| 202203201300-0000001 | 4 | 1 | 1 | 0 |
| 202203201300-0000002 | 3 | 2 | 2 | 0 |
|  |  |  |  |  |
| 202203201400-0000001 | 2 | 4 | 3 | 1 |
| 202203201400-0000002 | 3 | 5 | 4 | 1 |
| 202203201400-0000003 | 1 | 6 | 5 | 1 |
| 202203201400-0000004 | 8 | 7 | 6 | 1 |

FIG. 6D

| Delta | MinPageId | MaxPageId |
|---|---|---|
| 0 | 202203201300-0000001 | 202203201300-0000002 |
| 1 | 202203201400-0000001 | 202203201400-0000004 |

FIG. 6E

| PageId | Count | PageRank |
|---|---|---|
| 202203201300-0000003 | 2 | 3 |

FIG. 6F

| PageId | Count | PageRank | Asset-Page Rank | Delta |
|---|---|---|---|---|
| 202203201300-0000001 | 4 | 1 | 1 | 0 |
| 202203201300-0000002 | 3 | 2 | 2 | 0 |
| 202203201300-0000003 | 2 | 3 | 3 | 0 |
| 202203201400-0000001 | 2 | 4 | 4 | 0 |
| 202203201400-0000002 | 3 | 5 | 5 | 0 |
| 202203201400-0000003 | 1 | 6 | 6 | 0 |
| 202203201400-0000004 | 8 | 7 | 7 | 0 |

FIG. 6G

| Delta | MinPageId | MaxPageId |
|---|---|---|
| 0 | 202203201300-0000001 | 202203201400-0000004 |

FIG. 6H

TRACKING OF CONTINUOUS DATA PROCESSING WORKLOADS

BACKGROUND

Data processing systems may receive a stream of data processing work, i.e., commands, from one or more sources that is executed by one of many agents. For example, different agents may execute different types of commands or commands on different datasets. When many agents are executing the commands in the stream, when the application and completion of the work is critical for proper operation of the data processing system, and/or when the completed execution of the commands must be closely tracked for compliance purposes, the execution of the commands must be monitored in such a way that uncompleted work may be detected for a given source.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples and implementations disclosed herein are directed to systems and methods for tracking continuous data processing workloads. The method includes receiving a stream of signals, the signals including a plurality of commands to be executed; generating at least one timeslice in the received stream, the at least one timeslice corresponding to at least one period of time and including the plurality of commands; categorizing the plurality of commands into at least one page; assigning a unique identifier to the at least one page; transmitting the at least one page, including the unique identifier, to a command executing agent; and in response to receiving an indication that the at least one page is completed, marking each of the plurality of commands included in the at least one page as completed.

BRIEF DESCRIPTION OF THE DRAWINGS

The present description will be better understood from the following detailed description read in light of the accompanying drawings, wherein:

FIG. 6D illustrates an unrolled range of commands according to various examples of the present disclosure;

FIG. 6E illustrates a set of minimum page IDs and maximum page IDs according to various examples of the present disclosure;

FIG. 6F illustrates an additional acknowledged completed command according to various examples of the present disclosure;

FIG. 6G illustrates an updated unrolled range of commands according to various examples of the present disclosure;

FIG. 6H illustrates an updated set of minimum page IDs and maximum page IDs according to various examples of the present disclosure;

Corresponding reference characters indicate corresponding parts throughout the drawings. In FIGS. 1 to 7, the systems are illustrated as schematic drawings. The drawings may not be to scale.

DETAILED DESCRIPTION

Figure 1:
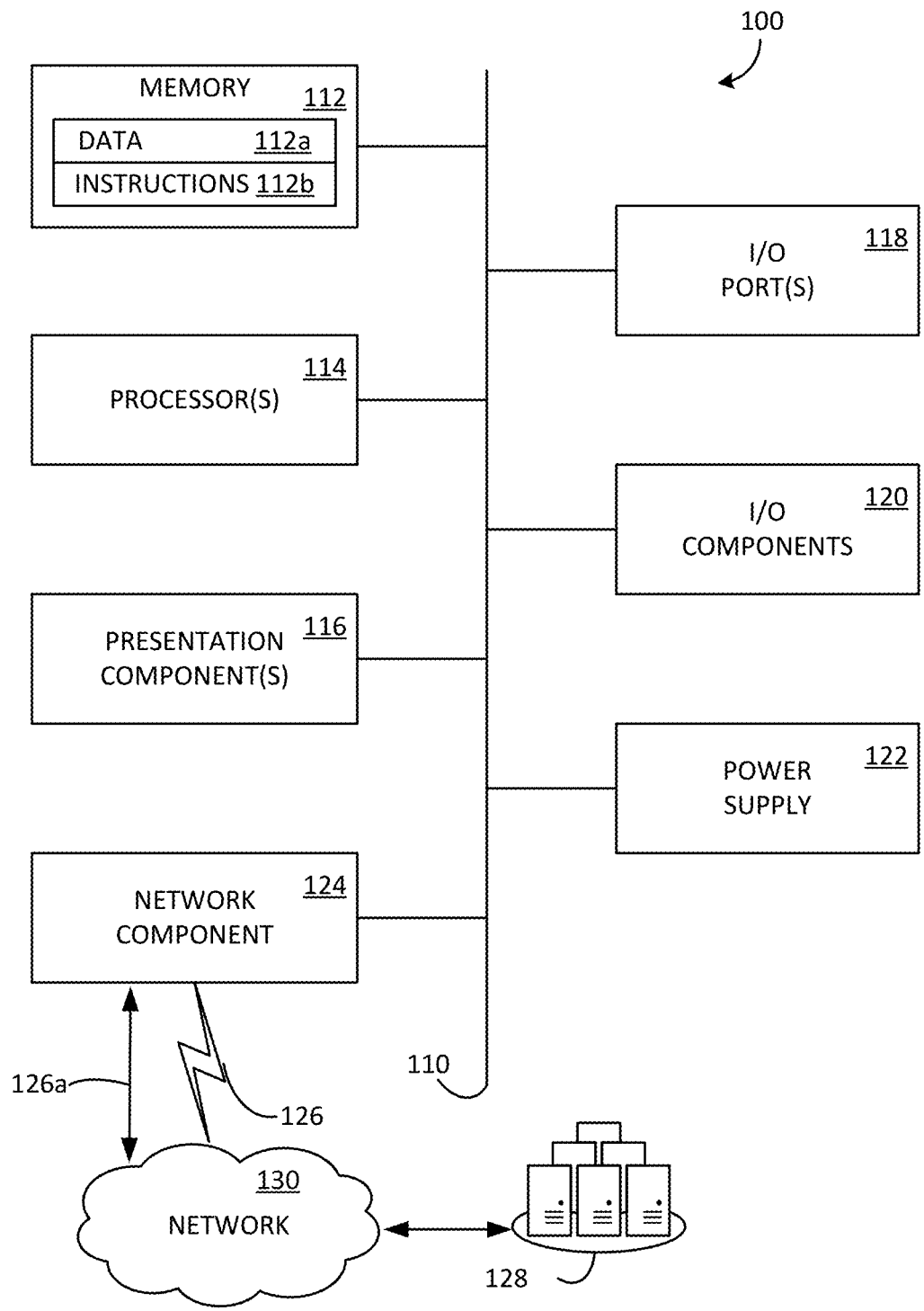
FIG. 1 is a block diagram illustrating an example computing device for implementing various examples of the present disclosure.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

As described herein, a data processing system may receive a stream of data processing work, i.e., commands, from one or more sources, or command sources. The commands may be executed by one of many agents. For example, the completion of these received commands from one or more command sources is tracked to determine which of the commands have been completed. However, the quantity of commands received may be sufficiently sizable to make tracking each command impractical. For example, some commands may need to be executed at more than one database. Thus, a single command may result in multiple tasks to be executed that may be tracked individually.

Current solutions address these challenges by tracking the state of each work-source combination in a tracking table. However, these solutions are unable to keep up with the scale of commands received. For example, at large scale, a table of commands and number of sources from which the commands are received may each exceed 1 million and the size of the tracking row may exceed 100 bytes. For example, the number of items that must be tracked is proportional to the number of work items (N), the number of sources (M) and the size (S) of the tracking row. In other words, the storage size=N*M*S. In an example where N and M are each 1 million and S is 100 bytes, the storage required may exceed 90 terabytes.

Furthermore, accurate monitoring, executing, tracking, and reporting of commands may be essential for compliance with local rules and regulations. For example, rules and regulations may give consumers the right to request their personal data be deleted upon request. A command may be a command, received from an individual or organization, to delete or export personal data. In examples where a command is received from a consumer that requests all personal data be deleted, complete execution of the command may involve deleting the personal data from tens or hundreds of different databases. Thus, accurate tracking of received commands to delete or export data in these situations is critical to ensure that all personal data has been deleted as requested by the consumer.

The present disclosure addresses these deficiencies by presenting systems and methods that divide the received commands into discrete units arranged in an ordered fashion. Each unit of work is assigned a unique identifier, such as a CommandID as described in greater detail below. The units of work are sorted into pages which are monotonically increasing and ordered in a range of identifiers, which are received and monitored in order to track completion of work items without tracking each work item individually. In one particular example, where completion of work items occurs out of order, newly received and acknowledged items may be appended to the list of completed work items and joined in order to extend lists where the work item is contiguous with the set.

Accordingly, the present disclosure provides a technical solution to a technical problem of monitoring received work orders with limited storage space characteristics. As data is received, added, and stored, the resulting output becomes smaller and smaller. While the range of work items completed increases, the data required to be stored decreases as the range may be expressed using fewer data points. The technical solution provides improved data storage space characteristics in combination with improved monitoring of the work items to be completed. For example, where the storage required in the above example may exceed 90 terabytes, by applying the solutions presented herein may be reduced to approximately 95 megabytes. For example, the storage size is equal to the number of sources (M) multiplied by the average number of non-continuous sets per source (P) multiplied by the size of expressing each set (Q). In other words, the storage size=M*P*Q. Where M=1,000,000, P=5, Q=20 bytes, then storage size is now a mere 95 megabytes, compared to exceeding 90 terabytes as provided by existing solutions.

FIG. 1 is a block diagram illustrating an example computing device 100 for implementing aspects disclosed herein and is designated generally as computing device 100. Computing device 100 is but one example of a suitable computing environment and is not intended to suggest any limitation as to the scope of use or functionality of the examples disclosed herein. Neither should the computing device 100 be interpreted as having any dependency or requirement relating to any one or combination of components/modules illustrated.

The examples disclosed herein may be described in the general context of computer code or machine- or computer-executable instructions, such as program components, being executed by a computer or other machine. Program components include routines, programs, objects, components, data structures, and the like that refer to code, performs particular tasks, or implement particular abstract data types. The disclosed examples may be practiced in a variety of system configurations, including servers, personal computers, laptops, smart phones, servers, virtual machines (VMs), mobile tablets, hand-held devices, consumer electronics, specialty computing devices, etc. The disclosed examples may also be practiced in distributed computing environments when tasks are performed by remote-processing devices that are linked through a communications network.

The computing device 100 includes a bus 110 that directly or indirectly couples the following devices: computer-storage memory 112, one or more processors 114, one or more presentation components 116, I/O ports 118, I/O components 120, a power supply 122, and a network component 124. While the computing device 100 is depicted as a seemingly single device, multiple computing devices 100 may work together and share the depicted device resources. For example, memory 112 is distributed across multiple devices, and processor(s) 114 is housed with different devices. Bus 110 represents what may be one or more busses (such as an address bus, data bus, or a combination thereof). Although the various blocks of FIG. 1 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 1 and the references herein to a "computing device."

Memory 112 may take the form of the computer-storage memory device referenced below and operatively provide storage of computer-readable instructions, data structures, program modules and other data for the computing device 100. In some examples, memory 112 stores one or more of an operating system (OS), a universal application platform, or other program modules and program data. Memory 112 is thus able to store and access data 112*a* and instructions 112*b* that are executable by processor 114 and configured to carry out the various operations disclosed herein. In some examples, memory 112 stores executable computer instructions for an OS and various software applications. The OS may be any OS designed to the control the functionality of the computing device 100, including, for example but without limitation: WINDOWS® developed by the MICROSOFT CORPORATION®, MAC OS® developed by APPLE, INC.® of Cupertino, Calif, ANDROID™ developed by GOOGLE, INC.® of Mountain View, California, open-source LINUX®, and the like.

By way of example and not limitation, computer readable media comprise computer-storage memory devices and communication media. Computer-storage memory devices may include volatile, nonvolatile, removable, non-removable, or other memory implemented in any method or technology for storage of information such as computer-readable instructions, data structures, program modules, or the like. Computer-storage memory devices are tangible and mutually exclusive to communication media. Computer-storage memory devices are implemented in hardware and exclude carrier waves and propagated signals. Computer-storage memory devices for purposes of this disclosure are not signals per se. Example computer-storage memory devices include hard disks, flash drives, solid state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number an organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device, CPU, GPU, ASIC, system on chip (SoC), or the like for provisioning new VMs when configured to execute the instructions described herein.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor 114, by multiple processors 114 within the computing device 100, or by a processor external to the client computing device 100. In some examples, the processor(s) 114 are programmed to execute instructions such as those illustrated in the flow charts discussed below and depicted in the accompanying figures. Moreover, in some examples, the processor(s) 114 represent an implementation of analog techniques to perform the operations described herein. For example, the operations are performed by an analog client computing device 100 and/or a digital client computing device 100.

Presentation component(s) 116 present data indications to a user or other device. Example presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways. I/O ports 118 allow computing device 100 to be logically coupled to other devices including I/O components 120, some of which may be built in. Example I/O components 120 include, for example but without limitation, a microphone, joystick, game pad, satellite dish, scanner, printer, wireless device, etc.

The computing device 100 may communicate over a network 130 via network component 124 using logical connections to one or more remote computers. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, network component 124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 124 communicates over wireless communication link 126 and/or a wired communication link 126a across network 130 to a cloud environment 128. Various different examples of communication links 126 and 126a include a wireless connection, a wired connection, and/or a dedicated link, and in some examples, at least a portion is routed through the Internet.

The network 130 may include any computer network or combination thereof. Examples of computer networks configurable to operate as network 130 include, without limitation, a wireless network; landline; cable line; digital subscriber line (DSL): fiber-optic line; cellular network (e.g., 3G, 4G, 5G, etc.); local area network (LAN); wide area network (WAN); metropolitan area network (MAN); or the like. The network 130 is not limited, however, to connections coupling separate computer units. Rather, the network 130 may also include subsystems that transfer data between servers or computing devices. For example, the network 130 may also include a point-to-point connection, the Internet, an Ethernet, an electrical bus, a neural network, or other internal system. Such networking architectures are well known and need not be discussed at depth herein.

As described herein, the computing device 100 may be implemented as one or more electronic devices such as servers, laptop computers, desktop computers, mobile electronic devices, wearable devices, tablets, and so forth. The computing device 100 may be implemented as a system 200 as described in greater detail below.

Figure 2:
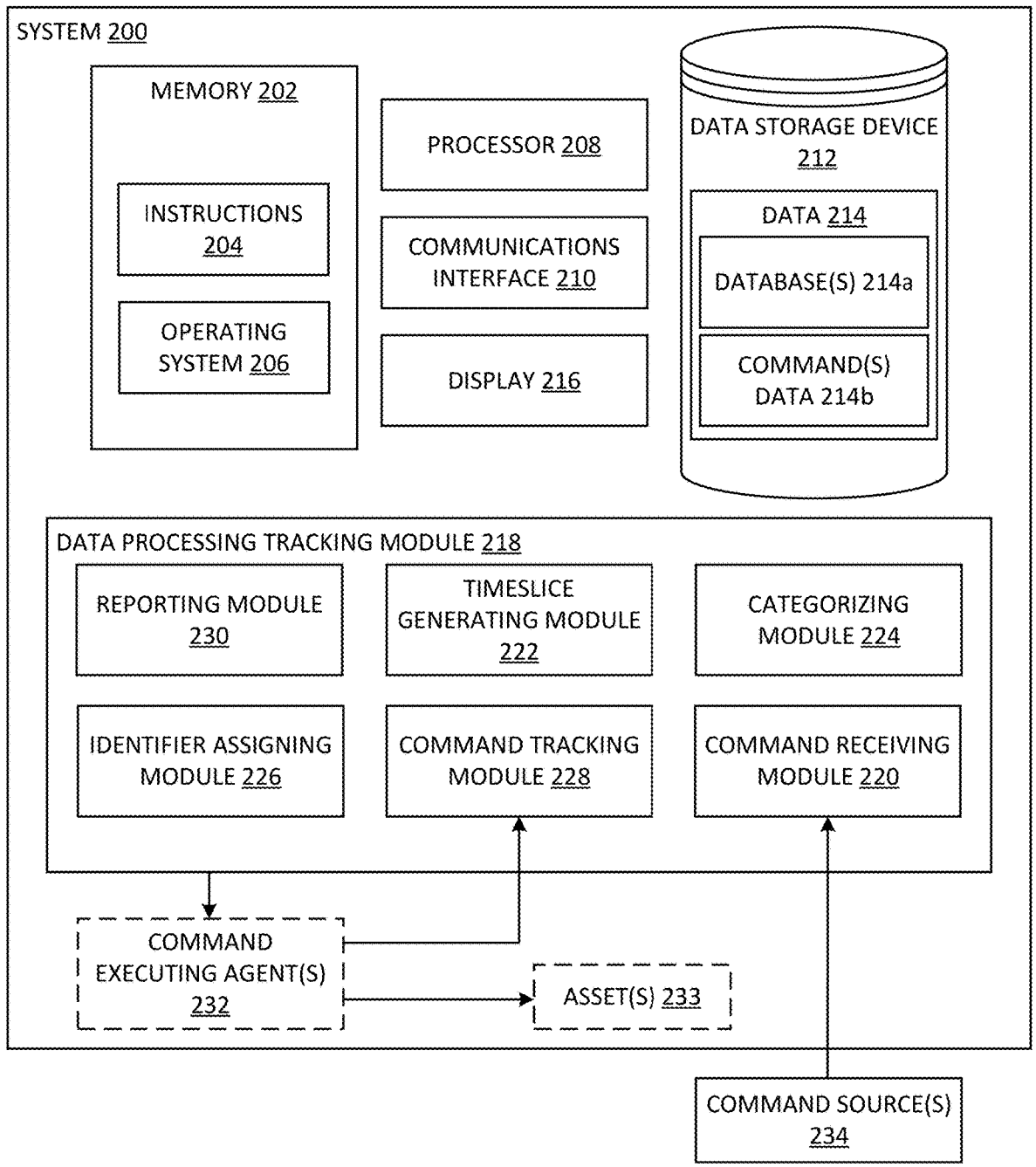
FIG. 2 is a block diagram illustrating an example system for tracking continuous data processing workloads according to various examples of the present disclosure.

FIG. 2 is a block diagram illustrating an example system for generating and presenting a performant material on an interface according to various examples of the present disclosure. The system 200 may include the computing device 100. In some implementations, the system 200 is presented as a single computing device that contains each of the components of the system 200. In some implementations, the system 200 includes one or more electronic devices.

The system 200 includes a memory 202, a processor 208, a communications interface 210, a data storage device 212, a display 216, and a data processing tracking module 218. The memory 202 stores instructions 204 executed by the processor 208 to control the data processing tracking module 218. The memory further stores an operating system (OS) 206. The OS 206 may be executed by the processor 208 and/or one or more elements implemented on the processor 208 to control one or more functions of the system 200.

The processor 208 executes the instructions 204 stored on the memory 202 to perform various functions of the system 200. For example, the processor 208 controls the communications interface 210 to transmit and receive various signals and data and controls the data storage device 212 to store particular data 214. In some implementations, other elements of the system 200, such as the data processing tracking module 218, are implemented on the processor 208 to perform specialized functions. For example, the data processing tracking module 218 controls one or more elements, such as the command receiving module 220, the timeslice generating module 222, the categorizing module 224, the identifier assigning module 226, the command tracking module 228, and the reporting module 230, to perform specialized functions as described herein.

The data storage device 212 stores data 214. The data 214 may include any type of data. For example, the data 214 may include one or more databases 214a storing data, including but not limited to personal data, browser history, financial data, and so forth. The data 214 may further include command data 214, which includes data related to commands including work items received by the command receiving module 220 from a command source 234. For example, the command data 214*b* may include a stream of signals that include commands including work items, information related to tracking a status of the received work items, and so forth. In one particular implementation, the tables illustrated in FIGS. 6A-6H and described in greater detail below are examples of the command data 214*b* stored on the data storage device 212.

In some implementations, the system 200 further includes a display 216. The display 216 may be an in plane switching (IPS) liquid-crystal display (LCD), an LCD without IPS, an organic light-emitting diode (OLED) screen, or any other suitable type of display. In some implementations, the display 216 is integrated into a device comprising the system 200, such as a display 216 of a laptop computer. In some implementations, the display 216 is presented external to one or more components included in the system 200, such as an external monitor or monitors. The processor 208 may control the display 216 to present a visualization of the data 214, such as data related to the work items, and/or one or more reports based on data related to the work items.

The data processing tracking module 218 is implemented on the processor 208 and includes a command receiving module 220, a timeslice generating module 222, a categorizing module 224, an identifier assigning module 226, a command tracking module 228, and a reporting module 230. Each of the command receiving module 220, the timeslice generating module 222, the categorizing module 224, the identifier assigning module 226, the command tracking module 228, and the reporting module 230 are examples of specialized computing devices implemented on the processor 208 to execute a specialized function.

The command receiving module 220 receives commands from a command source 234. In some examples, the command may include, but is not limited to, a command to delete data, a command to export data, and so forth. For example, the command source 234 may be a device associated with a user and the received command may be a command to delete personal data associated with the user from a particular database. Commands received from the command source(s) 234 may be executed by one or more command executing agents 232 on one or more assets 233. An asset 233 may be an entity to which the command is applied by a command executing agent 232. In other words, a command executing agent 232 applies a command, received from a command source 234, to a particular data asset 233 associated with the received command. However, various examples of assets are possible and not necessarily limited to data assets. In some implementations, commands may be applied to other assets 233 including another system, another device, and so forth.

The present disclosure contemplates multiple mechanisms to apply a command to a particular asset 233. For example, to delete personal data from a particular database, the command executing agent 232 deletes an entire row of data from the database that corresponds to the user requesting the deletion. In another example, the command source 234 may be a device associated with a user and the received command may be a command to delete all personal data associated with the user. To delete all personal data of a user, the command executing agent 232 deletes an entire row of data from each database in which the data is stored associated with the user requesting the deletion. In another example, the command source 234 may be a device associated with a user and the received command may be a command to export personal data associated with the user from one or more databases. To export personal data, the command executing agent 232 pulls a row of data corresponding to the user or specific values of data corresponding to the user and stores the data in a new file that may be sent to the user, downloaded by the user, and so forth.

Figure 3:
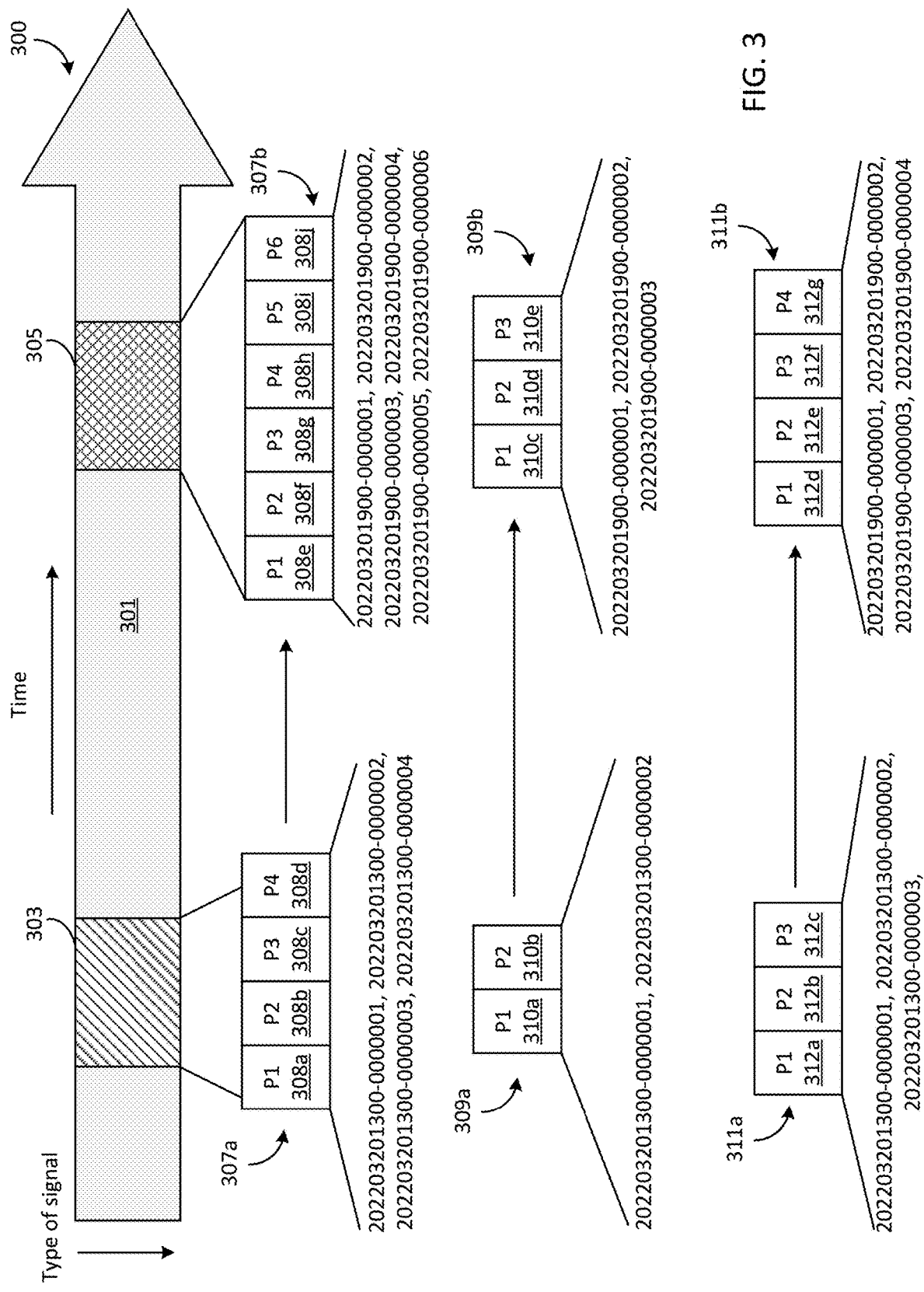
FIG. 3 illustrates first and second timeslices within a timeline of commands according to various examples of the present disclosure.

In some implementations, hundreds or thousands of commands may be received from one or more sources each minute. Thus, the command receiving module 220 may receive a stream of commands from one or more command sources 234. An example stream of signals may be the stream 301 illustrated in FIG. 3. For example, FIG. 3 illustrates a timeline of commands according to various examples of the present disclosure. The timeline 300 illustrated in FIG. 3 illustrates a stream 301 of commands received overtime. The command receiving module 220 receives each of the commands in the stream 301 from one or more command sources 234. In some examples, the stream 301 is a stream of data subject rights (DSR) signals, received from individuals exercising their right to delete or prevent the export of their data.

The timeslice generating module 222 generates one or more timeslices including commands received by the command receiving module 220 at a particular time. For example, the stream 301 includes a first timeslice, or time frame, 303 of received commands in the 13:00 hour of Mar. 20, 2022, and a second timeslice 305 of received commands in the 19:00 hour of Mar. 20, 2022. As referenced herein, a timeslice is a section of time within the stream 301. It should be understood that the times and dates of Mar. 20, 2022, in the 13:00 hour and 19:00 are for illustration only and should not be construed as limiting. Further, the timeslice generating module 222 may generate one or more timeslices for a time frame other than an hour. The timeslice generating module 222 may generate timeslices for a time frame in increments of one second, one minute, one hour, twelve hours, twenty-four hours, or any other increment.

The categorizing module 224 categorizes the received commands within each timeslice generated by the timeslice generating module 222. For example, the categorizing module 224 classifies the received commands by type. The types of signal received may include, but are not limited to, a signal to delete a specific type or types of data, such as an entire browser history or a specific search term, a signal indicating an account has been closed and all data associated with the account should be deleted, a bulk delete signal to delete everything associated with an account, a single delete signal to delete a specific aspect of data, and so forth. For example, the categorizing module 224 may identify at least three command types, as shown in FIG. 3. For example, the categorizing module 224 may identify a first command type 307*a*, a second command type 309*a*, and a third command type 311*a* within the first timeslice 303 and a first command type 307*b*, a second command type 309*b*, and a third command type 311*b* within the second timeslice 305. Each of the various command types 307-311 represent a similar type of command received. For example, the first command type 307*a* may include all requests received by the command receiving module 220, from one or more command sources 234, within the first timeslice 303 to delete all browser history and the second command type 307*b* may include all requests received by the command receiving module 220, from one or more command sources 234, within the second timeslice 305 to delete all browser history. The second command type 309*a* may include all requests received by the command receiving module 220, from one or more command sources 234, within the first timeslice 303 to close an account and accordingly delete all associated data and the second command type 309b may include all requests received by the command receiving module 220, from one or more command sources 234, within the second timeslice 305 to close an account and accordingly delete all associated data. The third command type 311a may include all requests received by the command receiving module 220, from one or more command sources 234, within the first timeslice 303 to delete a specific timestamped search term and the second command type 309b may include all requests received by the command receiving module 220, from one or more command sources 234, within the second timeslice 305 to delete a specific timestamped search term.

In some examples, the categorizing module 224 further generates one or more pages and categorizes each of the received commands into one of the generated pages within the categorized page type. As referenced herein, a page is a group of commands having up to a predetermined quantity. The generated page(s) may be the pages 308, 310, 312 described below. The predetermined quantity may include, but is not limited to, fifty commands, 100 commands, 200 commands, 500 commands, and so forth. As illustrated, the first command type 307a includes four pages, i.e., P1, P2, P3, and P4. Where the page includes 500 commands, each of the first page 308a, second page 308b, and third page 308c include 500 commands. The fourth page 308d may include a 500 commands or fewer than 500 commands. For example, where the first command type 307a includes 1800 commands, each of first page 308a, second page 308b, and third page 308c include 500 commands and the fourth page 308d includes 300 commands, i.e., the remainder of the 1800 commands. As another example, the first command type 307b includes six pages, i.e., P1, P2, P3, P4, P5, and P6. The first command type 307b may include between 2500 and 3000 commands, as each of the first page 308e, the second page 308f, the third page 308g, the fourth page 308h, and the fifth page 308i each include 500 commands and the sixth page 308j includes up to 500 commands. As illustrated in FIG. 3, the second command type 309a includes a first page 310a and a second page 310b, the second command type 309b includes a first page 310c, a second page 310d, and a third page 310e, the third command type 311a includes a first page 312a, a second page 312b, and a third page 312c, and the third command type 311b includes a first page 312d, a second page 312e, a third page 312f, and a fourth page 312g.

In some examples, the commands are expressed as individual work IDs, i.e., a CommandID. In some implementations, each CommandID is a globally unique identifier (GUID). The commands within each page are assigned by a signal paginator implemented on one or more of the timeslice generating module 222, the categorizing module 224, and the identifier assigning module 226. The range of pages including the commands may be expressed as a range such as $\{W_S\text{-}W_E\}$. In some examples, non-continuous ranges are required, so the page IDs may be expressed as a list of ranges such as $[\{W_{S1}\text{-}W_{E1}\}, \{W_{S2}\text{-}W_{E2}\}, \{W_{S3}\text{-}W_{E3}\} \ldots \{W_{Sn}\text{-}W_{En}\}]$. For example, each page 308, 310, 312 includes a particular range of work IDs related to the particular commands included on the respective page.

It should be understood that although FIG. 3 illustrates two timeslices in the stream 301, the two timeslices are presented for illustration only and should not be construed as limiting. A particular stream 301 may include any number of timeslices, including more or less than the two illustrated in FIG. 3, without departing from the scope of the present disclosure. In addition, although three command types are illustrated in FIG. 3, it should be understood that the three command types are presented for illustration only and should not be construed as limiting. A particular timeslice may include any number of command types, including more or less than the three illustrated in FIG. 3, without departing from the scope of the present disclosure.

The identifier assigning module 226 assigns a unique identifier to each generated page. The unique identifier may be referred to as a page ID (pageID) as described in greater detail below. The unique identifier may include a first identifier referring to the timeslice for which the page is generated and a second identifier referring to the specific page. For example, the first page 308a of the first command type 307a in the first timeslice 303 is assigned a unique identifier of 202203201300-0000001. The first identifier of 202203201300 refers to the date and timestamp of Mar. 20, 2022, in the 13:00 hour and the second identifier of 0000001 refers to the first page of the respective command type 307a. Using the same logic, the second page 308b is assigned 202203201300-0000002, the third page 308c is assigned 202203201300-0000003, and the fourth page is assigned 202203201300-0000004, the first page 308e is assigned 202203201900-0000001, the second page 308f is assigned 202203201900-0000002, the third page 308g is assigned 202203201900-0000003, the fourth page 308h is assigned 202203201900-0000004, the fifth page 308i is assigned 202203201900-0000005, and the sixth page 308j is assigned 202203201900-0000006.

It should be understood that the examples of pageIDs is presented for illustration only and should not be construed as limiting. The format of the unique identifier may include, but is not limited to, the first identifier and the second identifier described herein. In some implementations, the pageIDs may be stored in a schema, such as the tracking schema implemented by the command tracking module 228 described in greater detail below.

The respective pages of the second command types 309 and the third command types 311 are assigned a unique identifier in the same way as the first command type 307. In some examples, a unique identifier assigned to a page in the first command type 307 may also be assigned to a page in the second command type 309 or the third command type 311. For example, FIG. 3 illustrates the unique identifier 202203201300-0000001 is assigned to pages in each of the first command type 307, the second command type 309, and the third command type 311. This is permissible because the pages are categorized first by each command type, so the unique identifier of 202203201300-0000001 in the first command type 307 does not overlap with the unique identifier of 202203201300-0000001 in the second command type 309 or the unique identifier of 202203201300-0000001 in the third command type 311.

The pages of commands, including their assigned unique identifiers, may be exported, or transmitted, to a respective command executing agent 232 that executes the respective commands. In some examples, the data processing tracking module 218 may transmit pages of commands to a specific command executing agent 232 based on the type of command. For example, using the example above, where the command type 307 is a command to delete all browser history and the second command type 309 is a command to close an account and accordingly delete all associated data, pages of commands of the first command type 307 are transmitted to a first command executing agent 232 that deletes all browser history and pages of commands of the second command type 309 are transmitted to a second command executing agent 232 that closes accounts and deletes all associated data with the account.

In some implementations, the pages of commands to be transmitted are transmitted as a range. As illustrated in FIG. 3, a range for the command type 307 is expressed as [202203201300-0000001, 202203201900-0000006], because the first page 308*a* is assigned the unique identifier 202203201300-0000001, the last page is the sixth page 308*j* is assigned the unique identifier 202203201900-0000006, and each page between the first page 308*a* and the sixth page 308*j* is included and also transmitted for execution.

In some implementations, the one or more command executing agents 232 are executed on a same device within the system 200 as the data processing tracking module 218. For example, one or more components of the system 200 may be included on a single device, such as a laptop computer, a desktop computer, or a server. In this example, the database(s) 214*a* and the commands data 214*b* may be stored on a data storage device 212 housed within a same device as the data processing tracking module 218 and the command executing agent(s) 232. In other examples, one or more of the database(s) 214*a*, the commands data 214*b*, the data processing tracking module 218, and the command executing agent(s) 232 may be stored on a separate device, such as an external server or cloud server that is included within the system 200.

The command tracking module 228 tracks which pages of commands have been completed by the one or more command executing agents 232. For example, as a command executing agent 232 completes executing a page of commands, the page is returned to the command tracking module 228 with an indication that the page is completed. As each page is returned, the command tracking module 228 updates a range of returned pages. The range may initially include only one page, such as the first returned page, and subsequent pages are added to the range. For example, where each of the first page 308*a*, second page 308*b*, and third page 308*c* are returned, the range is expressed as [202203201300-0000001, 202203201300-0000003]. In some examples, some pages may be returned out of order. For example, following the third page 308*c* being returned, the next two pages to be returned may be the first page 308*e* and the second page 308*f*. In this example, the range is expressed as [202203201300-0000001, 202203201300-0000003], [202203201900-0000001, 202203201900-0000002], excluding the fourth page 308*d* which has, at this point in time, not been returned as completed. Upon receipt of the fourth page 308*d* as completed, the command tracking module 228 updates the range of completed pages and the range is expressed as [202203201300-0000001, 202203201900-0000002]. Thus, although additional data is provided as an input to the data processing tracking module 218, the output generated by the command tracking module 228 may become shorter and smaller. The processes executed by the command tracking module 228 will be described in greater detail in the description of FIGS. 6A-6H below.

In some implementations, the command tracking module 228 implements a tracking schema that includes required commands to be completed and commands that have been completed. For example, the command tracking module 228 computes the required work for each asset 233, which is tracked as a range of pages per CommandTypeID. The command tracking module 228 may either separately or in the same location track the completion of the required work for each asset 233 as signals are received from the respective command executing agent 232. Where the required and completed work is tracked together, the schema may include fields indicating the AssetID, CommandTypeID, RequiredWork, and CompletedWork. Where the required and completed work is tracked separately, the required work schema may include fields indicating the AssetID, CommandTypeID, and RequiredWork and the completed work schema may include fields indicating the AssetID, CommandTypeID, and CompletedWork.

The reporting module 230 reports the data tracked by the command tracking module 228. The reporting module 230 may report the data by presenting on a device of the system 200, such as by presenting the data on the display 216, or control the data to be transmitted to an external device for presentation by the communications interface 210. In some implementations, the reporting module 230 reports the data as it is tracked by the command tracking module 228. For example, the reporting module 230 may report one or both of the precise range or ranges of commands that have been completed and the precise range or ranges of commands that have not yet been completed. In other implementations, the reporting module 230 may report a representation of the range or ranges of commands that have been completed and/or that have not yet been completed. For example, the reporting module 230 may report one or more of a graph, a chart, an image, and so forth representing the range of commands that have been completed and/or the range of commands that have not been completed. The representation 700 may be an example of the graph or chart generated by the command tracking module 228 and output by the reporting module 230. In still other implementations, the command tracking module 228 may track and process the data and the reporting module 230 may report an analysis of the data instead of or in addition to the raw data or a representation of the raw data. For example, the command tracking module 228 may process the data and generate a scoring report that quantifies performance of a particular team or group in an organization, and the reporting module 230 may output the scoring report. In another example, the command tracking module 228 may process the data and generate a report quantifying the performance of the respective command executing agents 232 that execute the received commands, such as a count of the expected number of pages to have been completed and/or a count of the actual number of completed pages. The generated report may be output by the reporting module 230.

Figure 4:
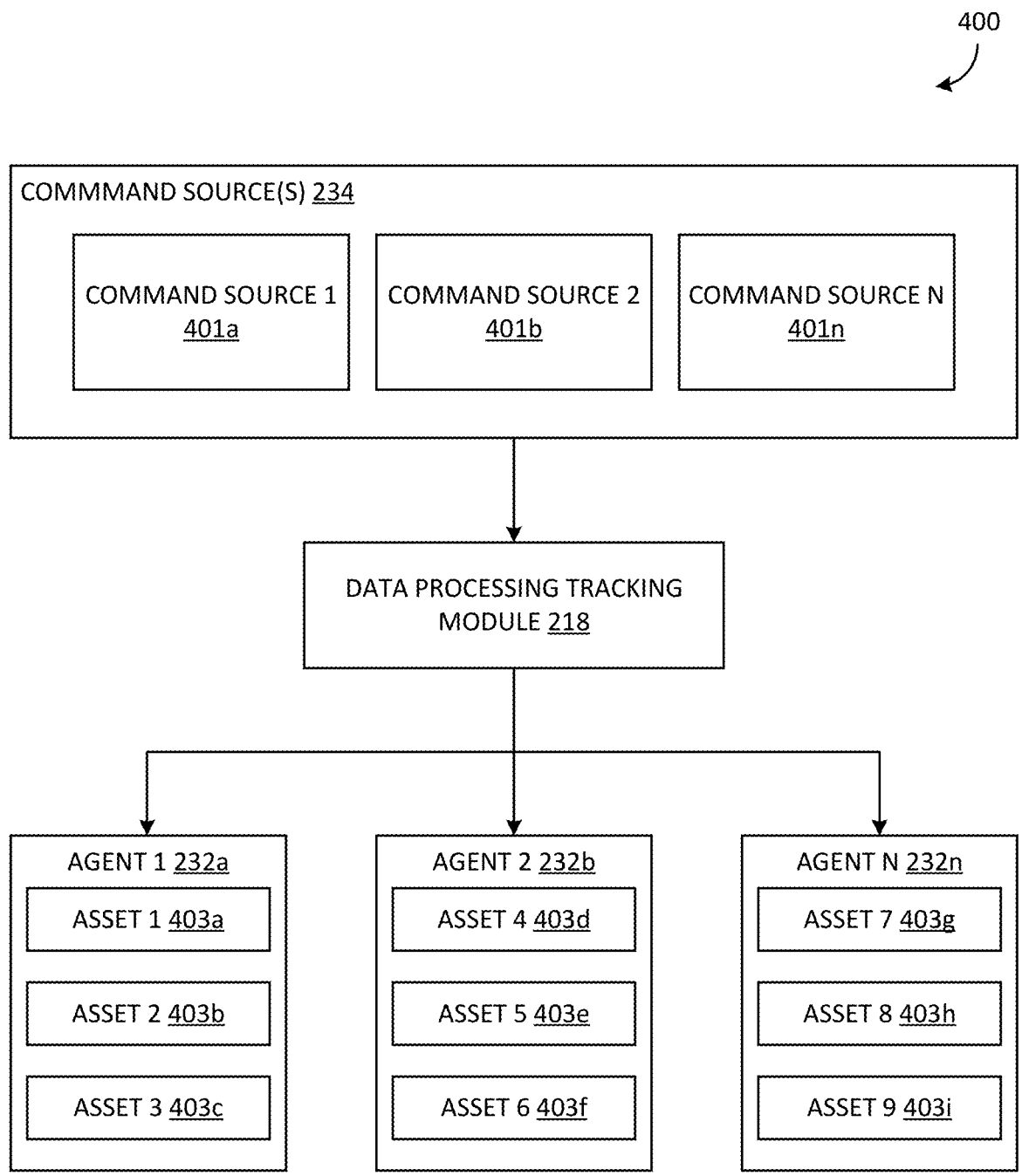
FIG. 4 is a system diagram illustrating an example flow of commands from one or more command sources to one or more agents according to various examples of the present disclosure.

FIG. 4 is a system diagram illustrating an example flow of commands from one or more command sources to one or more agents according to various examples of the present disclosure. The system 400 may include one or more elements of the system 200. For example, the system 200 may include one or more of the data processing tracking module 218, the command executing agent(s) 232, and the command sources 234.

The system 400 includes one or more command sources from which commands originate. For example, the command source 234 may include one or more command sources 401, such as a first command source 401*a*, a second command source 401, and a third command source 401*n*. Although illustrated in FIG. 4 as three command sources 401, the command source 234 may include more or fewer than three individual command sources 401 without departing from the scope of the present disclosure.

Each of the command sources 401 may transmit commands that are received by the command receiving module 220 of the data processing tracking module 218. The commands may be received in a stream of commands, such as the stream 301. The data processing tracking module 218 may take a set of commands that arrived in a certain time range, i.e., a timeslice, categorize the set of commands into specific CommandTypeIDs, and split each set of commands in the same timeslice CommandTypeID into one or more pages. For example, more than one page may be used where the number of commands exceed the allowed maximum number of commands per page. A mapping table is created that lists all of the CommandIDs and which page those CommandIDs appear on. However, because the commands on those pages may not be ordered, the commands may be tracked by ranges. The pages that are produced receive a PageID and the pages are ordered in a monotonically increasing manner for range-based tracking.

The pages of commands are then transmitted to one or more command executing agents 232 for performing the commands. For example, the command executing agent(s) 232 may include a first command executing agent 232a, a second command executing agent 232b, and a third command executing agent 232c. Each respective command executing agent 232 may include one or more assets upon which the commands are applied. For example, the first command executing agent 232a includes a first asset 403a, a second asset 403b, and a third asset 403c, the second command executing agent 232b includes a fourth asset 403d, a fifth asset 403e, and a sixth asset 403f, and the third command executing agent 232c includes a seventh asset 403g, an eighth asset 403h, and a ninth asset 403i. Although each respective command executing agent 232 is illustrated in FIG. 4 as including three assets 403, this example should be understood to be presented for illustration and should not be construed as limiting. Each respective command executing agent 232 may include more or fewer than three assets 403 without departing from the scope of the present disclosure.

Each of the assets 403 may be an example of the asset 233 illustrated in the system 200. For example, each asset 403 may be an example of data upon which a particular command is executed by the respective command executing agent 232. Each command executing agent 232 may execute commands received from one or more of the command sources 401. For example, the first command executing agent 232a may execute commands received from any of the first command source 401a, the second command source 401b, and the third command source 401c, the second first command executing agent 232b may execute commands received from any of the first command source 401a, the second command source 401b, and the third command source 401c, and the third command executing agent 232c may execute commands received from any of the first command source 401a, the second command source 401b, and the third command source 401c.

Figure 5:
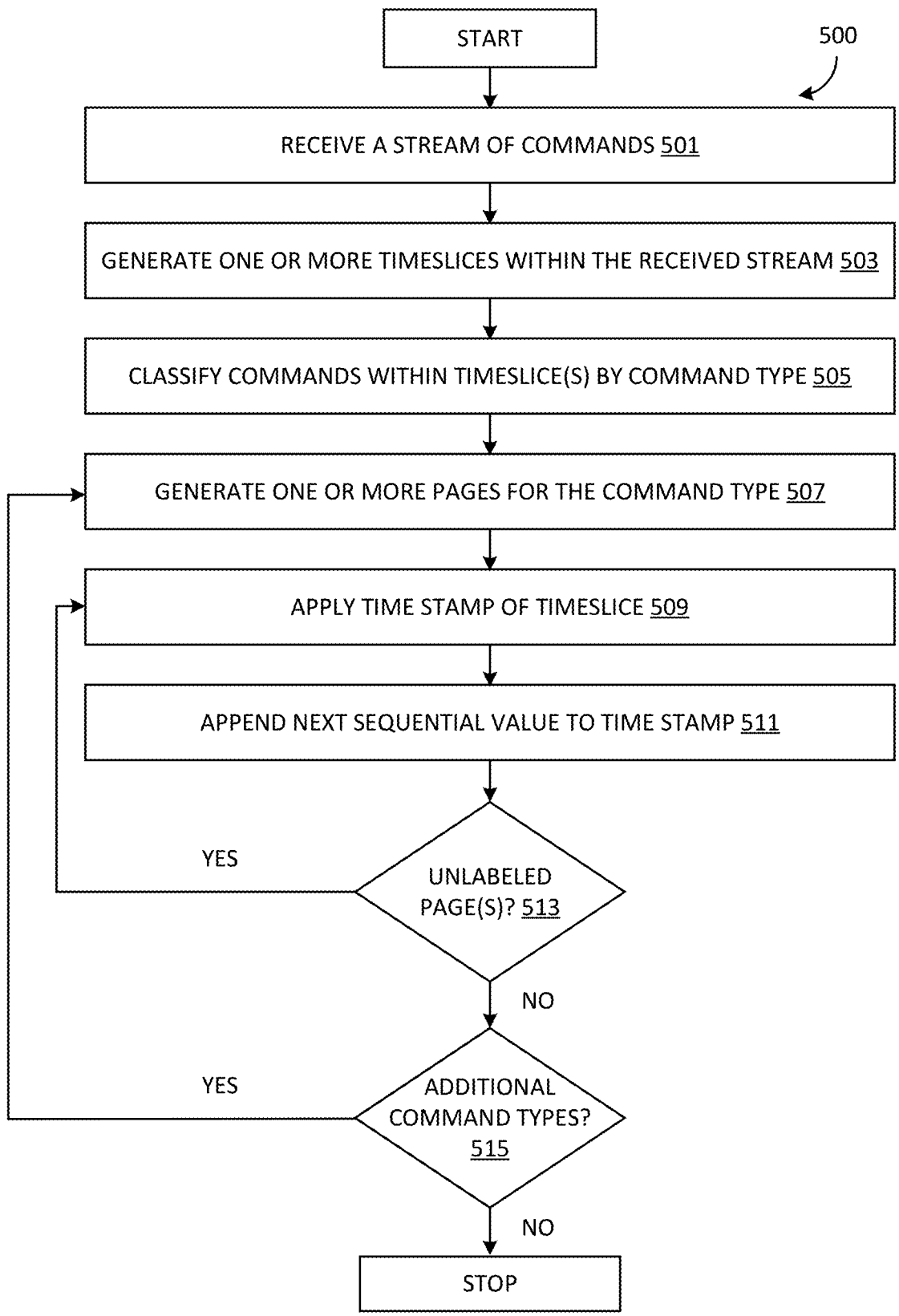
FIG. 5 is a illustrates a computer-implemented method of generating one or more unique identifiers according to various examples of the present disclosure.

FIG. 5 is a illustrates a computer-implemented method of generating one or more unique identifiers according to various examples of the present disclosure. The operations illustrated in FIG. 5 are for illustration and should not be construed as limiting. Various examples of the operations can be used without departing from the scope of the present disclosure. The operations of the flow chart 500 can be executed by one or more components of the system 200, including the processor 208, the command receiving module 220, the timeslice generating module 222, the categorizing module 224, and the identifier assigning module 226.

The flow chart 500 begins by the command receiving module 220 receiving a stream of signals, including commands, from one or more command sources 234 in operation 501. For example, the stream of commands may be the stream 301. The stream 301 may be a stream of signals including commands including, but not limited to, delete commands and export commands. In operation 503, the timeslice generating module 222 generates one or more timeslices within the received stream 301. As referenced herein, a timeslice is a section of time within the stream 301. Each timeslice may include a plurality of commands and a plurality of types of commands. For example, as illustrated in FIG. 3, the two timeslices 303, 305 may be generated within the stream 301. However, this example should not be construed as limited. Various examples are possible. The stream 301 may include more or fewer than two timeslices as shown in FIG. 3.

In operation 505, the categorizing module 224 classifies the commands within each timeslice by command type. As described herein, a command type may include, but are not limited to, a signal to delete a specific type or types of data, such as an entire browser history or a specific search term, a signal indicating an account has been closed and all data associated with the account should be deleted, a bulk delete signal to delete everything associated with an account, a single delete signal to delete a specific aspect of data, and so forth.

In operation 507, within each command type, the categorizing module 224 generates one or more pages for the classified command types. For example, within the first command type 307, the categorizing module 224 generates the first page 308a through the fourth page 308d for the first timeslice 303 and the first page 308e through the sixth page 308j for the second timeslice 305. Similarly, the second command type 309a includes a first page 310a and a second page 310b, the second command type 309b includes a first page 310c, a second page 310d, and a third page 310e, the third command type 311a includes a first page 312a, a second page 312b, and a third page 312c, and the third command type 311b includes a first page 312d, a second page 312e, a third page 312f, and a fourth page 312g.

The identifier assigning module 226 assigns a unique identifier to each page, which collectively includes operations 509 and 511. In operation 509, the identifier assigning module 226 applies a time stamp, also referred to herein as a first identifier. The time stamp includes a date and time, which refers to the timeslice in which the command was received. For example, a timestamp of Mar. 20, 2022, in the 13:00 may be expressed as 202203201300 in the first identifier. In operation 511, the identifier assigning module 226 appends a next sequential value to the applied time stamp. For example, the first page of the command type has a sequential value of 1, the second page has a sequential value of 2, and so forth. Collectively, the first page 308a for a first command type 307a of the first timeslice 303 is 202203201300-0000001, the second page 308b for the first command type 307a of the first timeslice 303 is 202203201300-0000002, and so forth.

In operation 513, the identifier assigning module 226 determines whether any additional pages are unlabeled. In examples where one or more pages are determined to be unlabeled, the flow chart 500 returns to operation 509 to apply the time stamp of the respective timeslice to the next sequential page.

In some implementations, one or more of the operations of the flow chart 500 are iteratively performed for each command type. For example, following the determination that there are no more unlabeled pages for the command type in operation 513, the flow chart 500 proceeds to operation 515 and the identifier assigning module 226 determines whether any additional command types remain unlabeled. Where the identifier assigning module 226 determines one or more command types remain unlabeled, the flow chart 500 returns to operation 507 and generates one or more pages for the next command type. For example, referring back to the example illustrated in FIG. 3, following each page of the first command type 307 being assigned a unique identifier, unique identifiers are then assigned to the pages of the second command type 309 and the third command type 311. In examples where additional command types are not determined to remain unlabeled, the flow chart 500 terminates.

In some implementations, one or more operations conducted in the flow chart 500 are performed by an application programming interface (API). For example, the process of assigning a unique identifier that collectively includes operations 509 and 511 may be executed on an API that monotonically increases the unique identifier(s) for each of the generated pages until each generated page has been assigned a unique identifier.

Monotonically increasing the unique identifiers provides several advantages. For example, as described herein, each command applies to a particular asset 233 based on some properties of the commands that match properties of the assets 233. The properties of the assets tend to be relatively stable over time because these properties are intrinsic to the particular asset 233. The properties may include, but are not limited to, the type of data contained in the asset 233, the type of user identifiers stored in the data, the product that collected the data, and so forth. Commands have similar or the same properties, which are used to assign specific commands to a specific CommandTypeID. Thus, all commands of a specific CommandTypeID either apply to the asset 233 or not applicable consistently for a long time range. However, in some implementations, the commands that apply to a particular asset 233 can change over time as new data is collected, different types of user identifiers are added to the system, additional products collect data, and so forth.

Because of the intrinsic stability of the properties, the required range of commands of a given CommandTypeID may be a long range. Therefore, monotonically increasing the unique identifiers enables the succinct tracking of days, weeks, months, and even years' worth of command pages that were required to be applied to a particular asset 233 using just the two numbers that include the range of pages, rather than listing each specific page or each specific command. In addition, pages of commands are provided to the command executing agents 232 in approximately the order in which the commands are received by the command receiving module 220, so the command executing agents 232 are likely to complete the commands approximately in order of the unique identifiers. This enables the command tracking module 228 to approximate when commands may be completed and more effectively track the completion of the commands.

However, in some instances the commands are not completed in the order in which they are transmitted to command executing agents 232, particularly in the newest set of pages being processed. Further, larger gaps may occur where the command executing agents 232 encounter bugs, a replay over a certain time range is issued, or in other edge cases. In these examples, a list of ranges is presented instead of a single range. The command tracking module 228 addresses the issue of a list of ranges, rather than a single range, by merging the ranges as described below in the description of FIGS. 6A-6H.

Figure 6A:
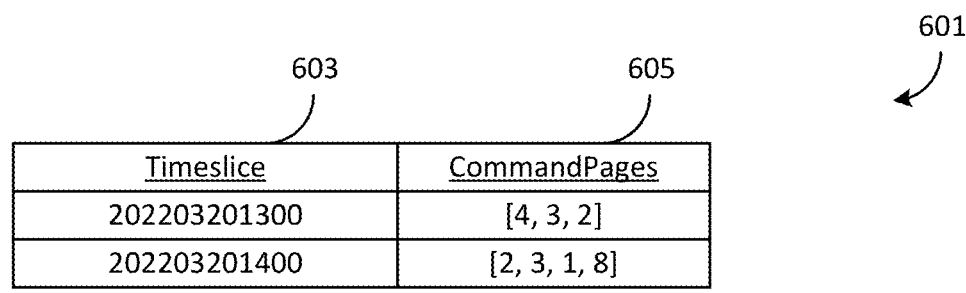
FIG. 6A illustrates a command index according to various examples of the present disclosure.

The particular format of the unique identifiers generated in by the operations of the flow chart 500 enables the command tracking module 228 to track which commands received by the command receiving module 220 have been completed and thus also enables the reporting module 230 to accurately output results and/or reports as described herein. For example, the command tracking module 228 may generate a command index for each command. For example, FIG. 6A illustrates an example first command index 601 according to various examples of the present disclosure. The first command index 601 may be generated by the command tracking module 228.

As shown in FIG. 6A, the first command index 601 is table, or index, that includes a first column 603 listing one or more timeslices and a second column 605 listing the respective command pages for each respective timeslice. The command index 601 illustrates two timeslices, 202203201300 and 202203201900. The command pages [4, 3, 2] refer to the timeslice 202203201300 and the command pages [2, 3, 1, 8] refer to the timeslice 202203201900. The command pages refer to the particular pages in the respective timeslice. For example, the first page of the timeslice 202203201300 includes four commands, the second page includes three commands, the third page includes two commands, and so forth. Likewise, the first of the timeslice 202203201900 includes two commands, the second page includes three commands, the third pages includes one commands, and the fourth page includes eight commands.

For example, the three command page values in the second column refer to the three pages in the timeslice 202203201300. The three pages have counts of 4, 3, 2, respectively. As referenced herein, a count refers to a count of commands on each page. Thus, the first page in the timeslice 202203201300 includes four counts, or commands, the second page includes three counts, and the third page includes two counts. Similarly, the first page in the timeslice 202203201900 includes two counts, the second page includes three counts, the third page includes one count, and the fourth page includes eight counts. It should be understood that the examples presented are for illustration and ease of description only. A particular timeslice can include more than four command pages or less than three command pages, and each respective page can include any number of counts, without departing from the scope of the present disclosure.

Figure 6B:
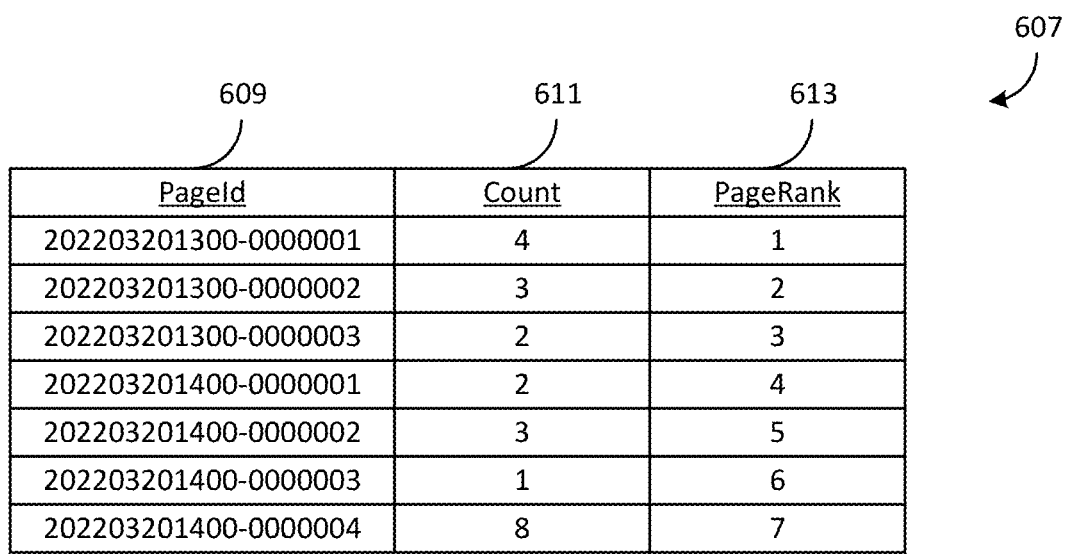
FIG. 6B illustrates an unrolled command index according to various examples of the present disclosure.

FIG. 6B illustrates an unrolled command index 607 according to various examples of the present disclosure. The unrolled command index 607 is an unrolled version of the first command index 601 providing additional detail regarding each timeslice in the first column 603. In other words, the first command index 601 is a condensed version of the unrolled command index 607. The unrolled command index 607 may be generated by the command tracking module 228.

The unrolled command index includes a first column 609 including one or more page IDs (PageID). Each page ID may be an example of a unique identifier as described herein. For example, the first column 609 includes page IDs corresponding to the three command pages in the 202203201300 timeslice and the four command pages in the 202203201900 timeslice illustrated in the first command index 601. The unrolled command index 607 further includes a second column 611 including the counts associated with each page ID. For example, the page having the page ID 202203201300-0000001 has four counts, or commands, the page having the page ID 202203201300-0000002 has three counts, and so forth. The unrolled command index 607 further includes a third column 613 including a page rank of each page ID. Each page rank is a sequential value for the page IDs presented in the first column 609. In other words, the first page ID presented in the first column 609, 202203201300-0000001, is assigned a page rank of one, the second page ID presented in the first column 609, 202203201300-0000002, is assigned a page rank of two, and so forth. In some examples, the command tracking module 228 assigns the page rank values to each page ID by implementing a windowing function. In some implementations, the windowing function is a Row Number( ) SQL function.

In some implementations, the command tracking module 228 generates the first command index 601 and then unrolls the first command index 601 to generate the unrolled command index 607. In other implementations, the command tracking module 228 generates the unrolled command index 607 and then condenses the unrolled command index 607 to generate the first command index 601.

Figure 6C:
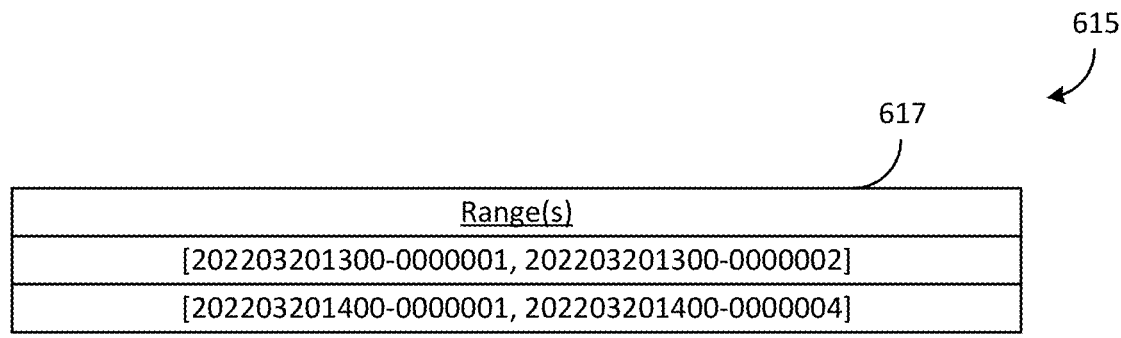
FIG. 6C illustrates a joined, completed range of commands according to various examples of the present disclosure.

Based on the unrolled command index 607, the command tracking module 228 generates a range of commands 615 to be completed. The range of commands 615 is illustrated in FIG. 6C. The range of command 615 is a joined, completed range of commands for each timeslice. For example, the range of commands 615 includes one column 617 presenting the range of commands to be completed for each timeslice. For example, the first timeslice 202203201300, presented in the first column 603 of the first command index 601, is expressed in the range of commands 615 as a range of [202203201300-0000001, 202203201300-0000002] and the second timeslice 202203201900, presented in the first column 603 of the first command index 601, is expressed in the range of commands 615 as a range of [202203201400-0000001, 202203201400-0000004]. In some implementations, the ranges illustrates in the column 617 can be expressed as a complete range, such as [202203201300-0000001, 202203201400-0000004]. Accordingly, the range of commands 615 provides the command tracking module 228 with the range of pages that include the commands to be completed. In other words, the range of commands 615 expresses the expectation of completed commands for a specific asset and/or command type, including the pages of commands transmitted to one or more of the command executing agents 232.

As the command tracking module 228 signals are received from the one or more command executing agents 232, the command tracking module 228 generates a completed command index 619, illustrated in FIG. 6D. The completed command index 619 includes pages that have been returned by the one or more command executing agents 232 as completed. In other words, the completed command index 619 tracks which pages included in the unrolled command index 607 have been returned as completed. The command tracking module 228 may generate the completed command index 619 by executing a join operation that maps the received, completed pages to the unrolled command index 607. For example, from the range in the one column 617, the start and end values from each row are separated into different columns to illustrate a range start column and a range end column. This index could be combined with the unrolled command index 607, for example with a CROSS JOIN command, and then filter to select the PageID, Count, and PageRanger where the PageID is >=RangeStart and PageID is <=RangeEnd.

For example, the completed command index 619 includes a first column 621 including page IDs of completed pages, a second column 623 including the counts of the completed pages, and a third column 625 including the page rank of the completed pages. The values of the first column 621, the second column 623, and the third column 625 may be the values of the respective pages included in the unrolled command index 607.

The completed command index 619 further includes a fourth column 627 that assigns asset-page ranks to the completed pages included in the completed command index 619. Each asset-page rank is a sequential value for the page IDs presented in the first column 621. In other words, the first page ID presented in the first column 621, 202203201300-0000001, is assigned an asset-page rank of one, the second page ID presented in the first column 621, 202203201300-0000002, is assigned an asset-page rank of two, and so forth. In some examples, the command tracking module 228 assigns the asset-page rank values to each page ID by implementing a windowing function.

As shown in FIG. 6D, the completed command index 619 includes an empty row 629. The empty row 629 illustrates that at least one page of commands has not been returned as completed. When compared to the unrolled command index 607, the completed command index 619 does not include the page ID of 202203201300-0000003 that is included in the unrolled command index 619, indicating the third page assigned the page ID of 202203201300-0000003 has not been completed. Because the third page is included in the unrolled command index 607 but is not included in the completed command index 619, some of the asset-page rank values in the fourth column 627 do not match the page rank values in the third column 625. The completed command index 619 further includes a fifth column 631 including a delta value for each page ID. Each delta value represents a difference between the page rank value in the third column 625 and the asset-page rank value in the fourth column 627 for a respective page ID. For example, the first page ID 202203201300-0000001 and the second page ID 202203201300-0000002 each have a page rank value of one and an asset-page rank value of one. There is no difference between the page rank value and the asset-page rank value, so the delta values for each of the first page ID 202203201300-0000001 and the second page ID 202203201300-0000002 are zero. However, the fourth page ID 202203201900-0000001 has a page rank value of four and an asset-page rank value of three. The difference between the page rank value and the asset-page rank value is one, so the delta value is one. The delta values in the fifth column 631 change at each continuity break in the completed command index 619, indicating a missing page.

In some implementations, the command tracking module 228 generates a delta index 633 that maps the minimum and maximum page IDs to each delta value included in the fifth column 631 of the completed command index 619. For example, the delta index 633 includes a first column 635 that presents each delta value from the completed command index 619. The completed command index 619 includes delta values of one and zero, so the delta index 633 presents a first row corresponding to the delta value of zero and a second row corresponding to the delta value of one. The delta index 633 further includes a second column 637 illustrating the minimum page ID for each delta value and a third column 639 illustrating the maximum page ID for each delta value.

For example, in the completed command index 619, the minimum page ID that has a delta value of zero is the page assigned the page ID of 202203201300-0000001 and the maximum page ID that has a delta value of zero is the page assigned the page ID of 202203201300-0000002. Similarly, the minimum page ID that has a delta value of one is the page assigned the page ID of 202203201900-0000001 and the maximum page ID that has a delta value of one is the page assigned the page ID of 202203201900-0000004. When compared to the range of commands 615 illustrated in FIG. 6C, the delta index 633 does not include the page assigned the page ID of minimum page ID that has a delta value of zero is the page assigned the page ID of 202203201300-0000001 and the maximum page ID that has a delta value of zero is the page assigned the page ID of 202203201300-0000003, because the page has not yet been returned as completed.

FIG. 6F illustrates an index comprising one or more additional acknowledged completed pages of commands according to various examples of the present disclosure. The index 641 may be presented in a similar format as the unrolled command index 607. For example, the index 641 includes a first column 643 indicating a page ID, a second column 645 indicating a count value of the page ID, and a third column 647 indicating a page rank value of the page ID. The index 641 may be received from the one or more command executing agents 232 by the command tracking module 228.

The index 641 illustrated in FIG. 6F includes a page ID value of 202203201300-0000003, a count of two, and a page rank of three. Thus, the index 641 indicates that a new page ID having a page ID of 202203201300-0000003, a count of two, and a page rank of three has been completed by one of the command executing agents 232. In order to update the completed command index 619, the page ID value, count value, and page rank value may be added to the completed command index 619, as illustrated in the updated completed command index 649. The updated completed command index 649, illustrated in FIG. 6G, may be the completed command index 619 illustrated in FIG. 6D, but with the addition of the values received in the index 641. For example, the updated completed command index 649 includes a first column 651, a second column 653, a third column 655, a fourth column 657, and a fifth column 659 analogous to the first column 621, the second column 623, the third column 625, the fourth column 627, and the fifth column 631 of the completed command index 619. In other words, the updated completed command index 649 is an updated version of the completed command index 619.

For example, the updated completed command index 649 includes a filled row 661 including the newly added page ID value of 202203201300-0000003 and its associated count value and page rank value. The filled row 661 is specifically identified as corresponding to the empty row 629 identified in the completed command index 619, but is no longer empty because the page ID, count, and page rank values have been updated using the values included in the acknowledged index 641. In response to the addition of the newly filled row 661 with the page ID, count, and page rank values from the index 641, the command tracking module 228 updates the asset-page rank values in the fourth column 657. Each asset-page rank is a sequential value for the page IDs presented in the first column 651. In other words, the first page ID presented in the first column 651, 202203201300-0000001, is assigned an asset-page rank of one, the second page ID presented in the first column 651, 202203201300-0000002, is assigned an asset-page rank of two, and so forth. In some examples, the command tracking module 228 assigns the asset-page rank values to each page ID by implementing a windowing function.

It should be understood that the addition of the values corresponding to the third page having a page ID of 202203201300-0000003 causes the asset-page rank values of pages following the third page to change from the completed command index 619 to the updated completed command index 649. For example, in the completed command index 619, the fourth page having a page ID of 202203201900-0000001 has an asset-page rank value of three, but in the updated completed command index 649 the asset-page rank value is updated to four. Accordingly, the delta value, presented in the fifth column 659, is also changed from the completed command index 619 to the updated completed command index 649. Because the difference between the page rank value and the asset-page rank value is zero in the updated completed command index 649, the delta value of the fourth page having a page ID of 202203201900-0000001 is zero. Thus, the updated asset-page rank values cause a consequential update to the delta values.

Due to the addition of the values corresponding to the third page having a page ID of 202203201300-0000003, the page ID, count, and page rank values of the updated completed command index 649 match, i.e., map to, the page ID, count, and page rank values of the unrolled command index 607. Due to the correct mapping of the page ID, count, and page rank values of the updated completed command index 649 to the page ID, count, and page rank values of the unrolled command index 607, the command tracking module 228 confirms the commands of the first timeslice and the second timeslice in the command index 601 are completed.

The completion of the commands included in the command index 601 is confirmed by the command tracking module 228 generating an updated delta index 663. The updated delta index 663, illustrated in FIG. 6H, is an update to the completed command index 619 and is automatically generated upon the updates to the delta values in the fifth column 659 of the updated completed command index 649. The updated delta index 663 is analogous to the delta index 633, although includes updated data fields corresponding to the updated completed command index 649. For example, the updated delta index 663 maps the minimum and maximum page IDs to each delta value included in the fifth column 659 of the updated completed command index 649. However, because the page rank values and asset-page rank values in the updated completed command index 649 are each equal, the first column 665 identifies the delta values of each page ID are zero. Thus, the updated delta index 663 includes only one row, expressing the delta value of zero, a minimum page ID of 202203201300-0000001 in a second row 667, and a maximum page ID of 202203201400-0000004 in a third row 669.

It should be understood that as shown at least in FIGS. 6A-6H, the addition of new data may result in less data being stored and/or output. For example, the delta index 633, i.e., the first delta index generated, results in two rows of data being stored and/or output because the two delta values result in a minimum page ID and maximum page ID being stored for both the delta value equal to zero and the delta value equal to one. However, the updated delta index 663, i.e., the second, or updated, delta index generated, resulting in only one row of data being stored and/or output because the additional input of the index 641 is added to the updated completed command index 649, resulting in only one delta value. Accordingly, the updated delta index 663 provides only one row of data to be stored and/or output because the one delta value equal to zero results in only a single set of minimum page ID and maximum page ID values being stored. Therefore, FIGS. 6A-6H illustrate an example of a technical solution of improved tracking and storage of vast quantities of pending and/or executed commands that is provided by the present disclosure.

It should be understood that the commands and pages illustrated in FIGS. 6A-6H are commands and pages for a single command type, such as one of the first command type 307a, the second command type 307b, and the third command type 307c. The command tracking module 228 may execute the processes and systems described herein with regards to FIGS. 6A-6H for more than one command type simultaneously, one after the other, and so forth.

Accordingly, as illustrated in FIGS. 6A-6H, the command tracking module 228 may perform various operations, particularly from the unrolled command index 607. In particular, the command tracking module 228 may unroll a range to the unrolled command index 607 and/or regroup the unrolled command index 607 to ranges to perform various operations. In one example, the command tracking module 228 appends new expected or completed pages by expanding the current range, merging the newly received pages to the current range, and regrouping to the ranges based on the determined delta values. In another example, the command tracking module 228 appends a new range of pages to the current range or ranges by expanding both sets of ranges, merging the ranges, regrouping the ranges based on the delta values, count the number of expected commands, and expand the pages included in the expected ranges. In another example, the command tracking module 228 retrieves a count of expected pages and completed pages by expanding the pages and generating a sum of the counts, or commands per page. In another example, the command tracking module 228 filters the acknowledged pages to only pages that are expected by expanding both the expected command and completed commands form their respective ranges, performing a semi joining operation on the expanded commands, and generating a sum. For example, a semi joining operation may be used where a command executing agent 232 sends a completion event for a PageID that is not required. Thus, when the completion rate is computed, which measures the number of completed command divided by the number of required commands, the percentage of completed commands may be greater than 100%. To avoid this scenario, a semi joining operation may be executed to semi-join the completed page list and the required page list so that only pages both completed and required to be completed are used in the calculation. In another example, the command tracking module 228 retrieves a list of pending pages, i.e., pages that are not yet completed, by expanding indices of the expected and completed pages, performing an anti-semijoin operation to find all expected pages that are not yet completed, and regrouping to ranges. For example, an anti-semijoin operation may be executed to find all required pages that are not completed. The command tracking module 228 may execute the anti-semijoin operation to determine the pages of commands to be sent or resent to the executing agent.

Figure 7:
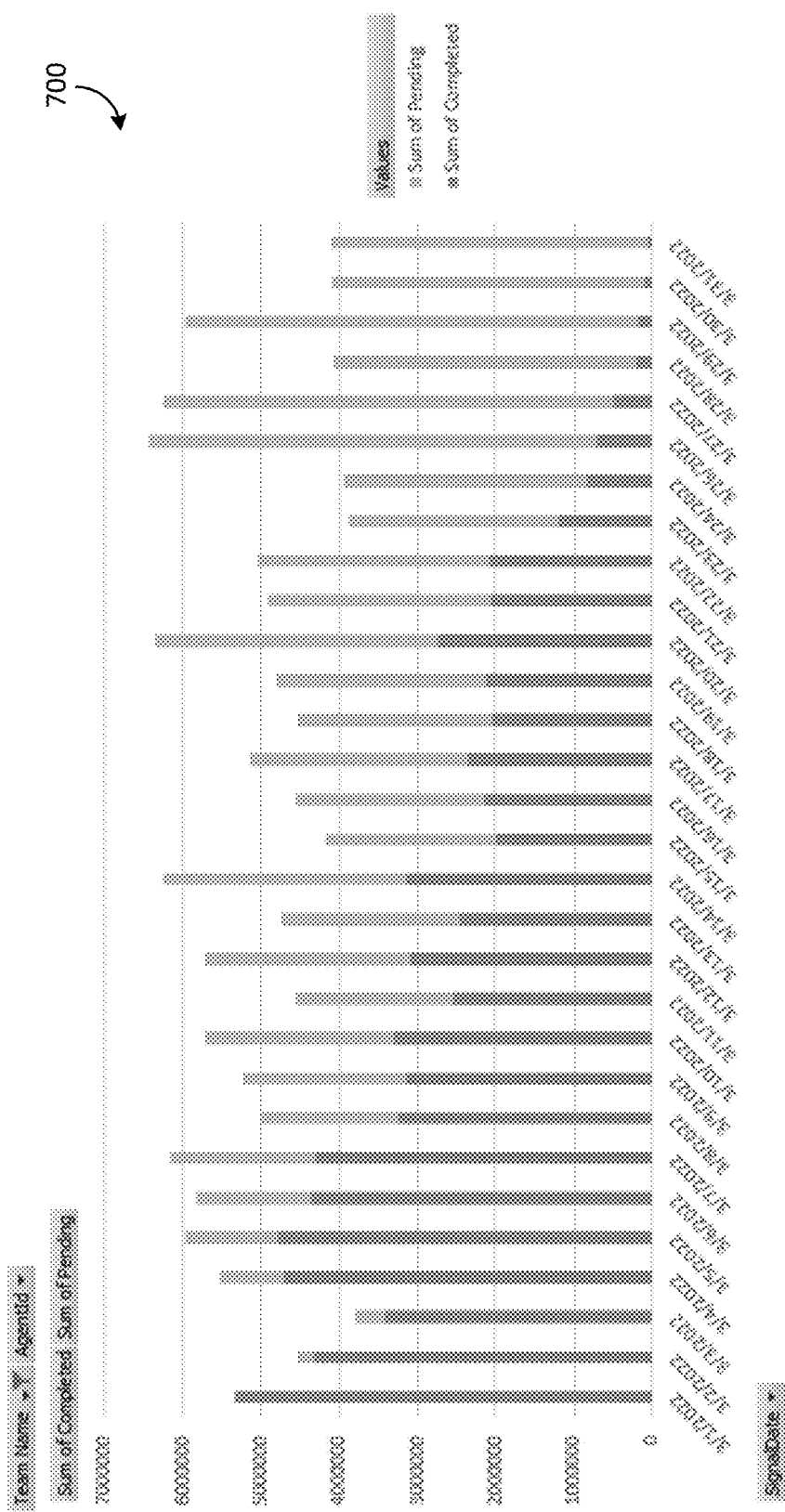
FIG. 7 illustrates a representation of data tracked according to various examples of the present disclosure.

FIG. 7 illustrates a representation of data tracked according to various examples of the present disclosure. The representation of data if provided for illustration only. Various representations of the data illustrated in FIG. 7 may be presented without departing from the scope of the present disclosure.

FIG. 7 illustrates a representation 700 of received commands. The representation 700 illustrates completed commands and pending commands for each of a plurality of dates. The command tracking module 228 marks the commands are marked as completed upon reception of a signal from the respective command executing agent 232 that the command has been completely executed. In some examples, as described herein, the command tracking module 228 may receive a signal from the respective command executing agent 232 that a page or pages of commands have been completed executed, and each command on the page or pages is marked as completed. Commands shown as pending in the representation are commands for which the command tracking module 228 has not received a signal indicating the command has been completely executed.

The representation 700 illustrates that commands are completed in approximately the order in which the commands are received. For example, the commands received on the earliest date, Mar. 1, 2022, is shown to be entirely completely completed or nearly completed. Commands received on the next earliest dates, Mar. 2, 2022 and Mar. 3, 2022, are shown with a relatively high percentage of completeness. In contrast, the commands received on later dates, such as Mar. 24, 2022, are shown with a much lower percentage of completeness than the earlier dates of Mar. 1, 2022, Mar. 2, 2022, and so forth. Accordingly, the representation 700 illustrates the principle that commands are generally completed in the order they are received by the data processing tracking module 218, although the results may occasionally vary. Some earlier received commands may take longer to be completed and/or some later received commands may be completed more quickly.

The representation 700 may be generated by the reporting module 230 based on the data received and processed by the command tracking module 228. For example, the reporting module 230 may output and present the representation 700 via the display 216. In another example, the reporting module 230 may control the communications interface 210 to output the representation 700 to an external device for presentation.

In some implementations, the command tracking module 228 generates a representation that illustrates a percentage of commands completed by day received in text form. In other implementations, the command tracking module 228 generates a representation that illustrates a percentage of commands completed by each command executing agent 232 in text form. In other implementations, the command tracking module 228 generates a representation that illustrates a number of commands completed and a number of commands assigned to each respective command executing agent 232, instead of or in addition to a percentage.

Figure 8:
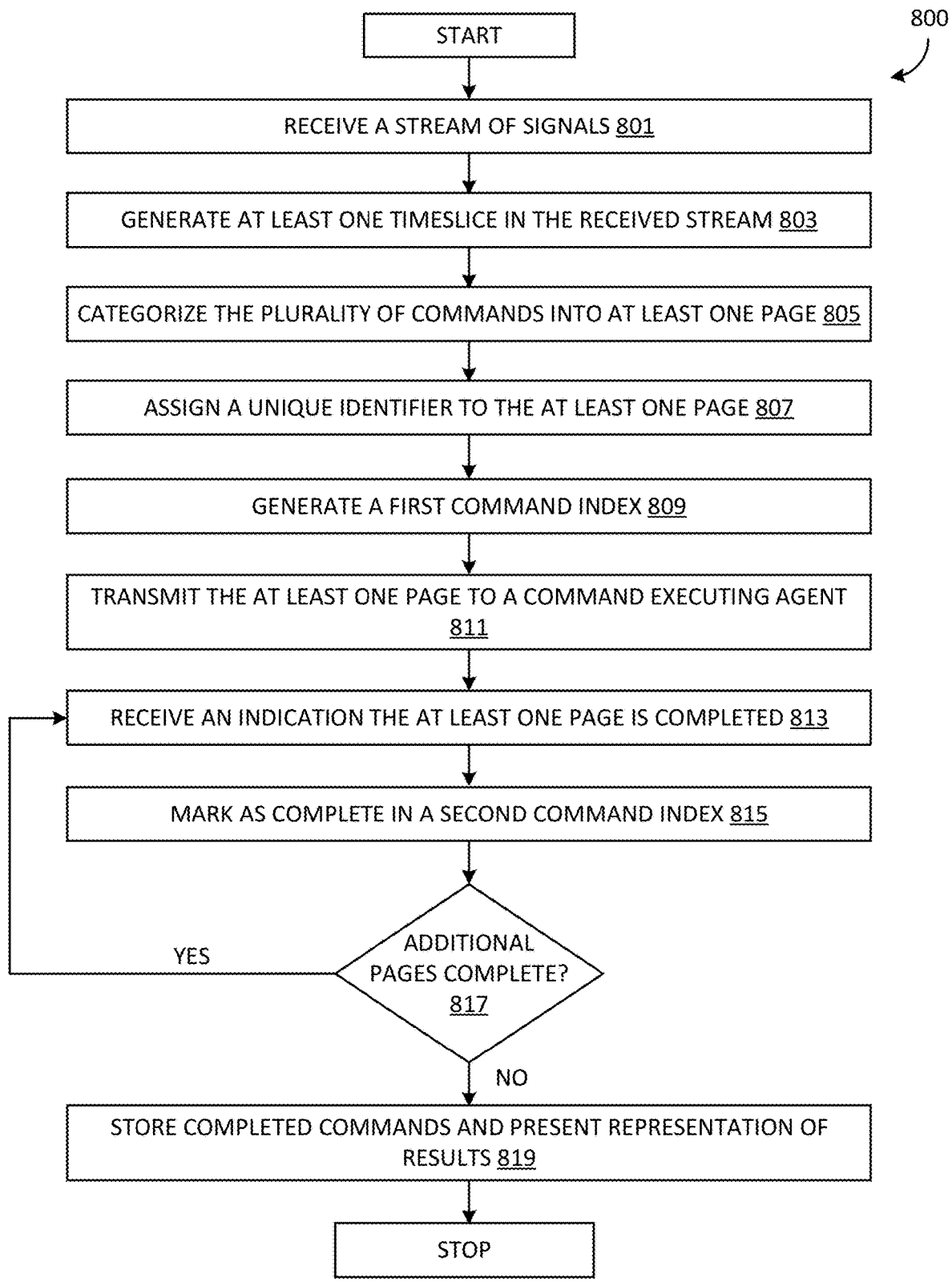
FIG. 8 illustrates a computer-implemented method of tracking continuous data processing workloads according to various examples of the present disclosure.

FIG. 8 illustrates a computer-implemented method of generating a performant material according to various examples of the present disclosure. The operations illustrated in FIG. 8 are for illustration and should not be construed as limiting. Various examples of the operations can be used without departing from the scope of the present disclosure. The operations of the flow chart 800 can be executed by one or more components of the system 200, including the processor 208 and the data processing tracking module 218.

The flow chart 800 begins by the data processing tracking module 218 receiving a stream of signals in operation 801. The received stream may be the stream 301. The signals may include one or more commands that are received from one or more users to be executed. Further, the commands may include different types of commands. For example, the commands may include, but are not limited to, a first type of command, such as delete commands to delete data, and a second type of command, such as export commands to export data. In some implementations, the signals may be one of tens or hundreds of different types of commands.

In operation 803, the data processing tracking module 218 generates at least one timeslice in the received stream 301. The at least one timeslice may be a timeslice such as the first timeslice 303 or the second timeslice 305. As referenced herein, a timeslice corresponds to at least one period of time and includes the plurality of commands received during the at least one period of time. For example, the first timeslice 303 corresponds to the 13:00 hour of Mar. 20, 2022, and includes all commands received during the 13:00 hour on Mar. 20, 2022, while the second timeslice 305 corresponds to the 19:00 hour of Mar. 20, 2022, and includes all commands received during the 19:00 hour on Mar. 20, 2022. However, it should be understood that the first timeslice 303 and the second timeslice 305 are presented for illustration only and should not be construed as limiting. A timeslice may be generated in increments of one second, one minute, one hour, twelve hours, twenty-four hours, or any other increment. Further, more or fewer than two timeslices may generated.

In operation 805, the data processing tracking module 218 categorizes the plurality of commands into at least one page. In some implementations, categorizing the plurality of commands into at least one page includes categorizing the plurality of commands by type of command and then categorizing each of the types of commands into pages. For example, commands in the first type of commands are categorized into a first set of pages and commands in the second type of commands are categorized into a second set of pages. As referenced herein, a page is a group of commands having up to a predetermined quantity. The predetermined quantity may include, but is not limited to, fifty commands, 100 commands, 200 commands, 500 commands, and so forth.

In operation 807, the data processing tracking module 218 assigns a unique identifier to each page. As described herein, the unique identifier may include a first identifier referring to the timeslice for which the page is generated and a second identifier referring to the specific page. For example, the data processing tracking module 218 assigns the first page 308*a* of the first command type 307*a* in the first timeslice 303 a unique identifier of 202203201300-0000001. The data processing tracking module 218 retrieves the timestamp associated with the respective timeslice, i.e., 202203201300, and then appends a monotonically increasing value to the retrieved timestamp to generate the unique identifier. In the example of the first page 308*a* of the first command type 307*a* in the first timeslice 303, the first identifier of 202203201300 is the retrieved timestamp of Mar. 20, 2022, in the 13:00 hour and the appended second identifier of 0000001 refers to the first page of the respective command type 307*a*. The data processing tracking module 218 continues to assign unique identifiers to each page by monotonically increasing the second identifiers until each page has been assigned a unique identifier.

In operation 809, the data processing tracking module 218 generates a first command index that includes the plurality of pages. For example, the first command index may be the unrolled command index 607. The first command index is an index that lists all the pages, for a particular command type, that are expected to be completed. For example, the first command index may include each unique identifier, a page rank value associated with the each unique identifier, and an asset-page rank value associated with the each unique identifier.

In operation 811, the data processing tracking module 218 transmits the at least one page to a command executing agent 232. The command executing agent 232 may be a specific agent that completed the type of commands included in the page. In some implementations, the at least one page is transmitted to the command executing agent in the form of the first generated index. In other implementations, the at least one page is transmitted to the command executing agent as a list of pages.

In operation 813, the data processing tracking module 218 receives an indication from the command executing agent 232 that at least one page of commands has been completed. In some implementations, the indication is received from the command executing agent 232 as an index including all acknowledged completed pages of commands, such as the index 641. The index may include one page or more than one page. In other implementations, the indication is received from the command executing agent 232 as a list of a completed page or pages that is not in the form of an index.

In operation 815, the data processing tracking module 218 marks the received page as complete in a second command index. In some examples, where the received page is the first received page as complete, operation 815 includes generating a second command index in response to receiving the indication that the first page of commands has been completed. The second command index may be the completed command index 619 and/or the updated completed command index 649. The second command index is a list of the completed pages and tracks the pages of commands that have been received from the command executing agent 232 as completed as well as which pages of commands have not been received from the command executing agent 232 as completed. The second command index may include each unique identifier, a page rank value associated with the each unique identifier, and an asset-page rank value associated with the each unique identifier for each page that has been received from the command executing agent 232 as completed. The data processing tracking module 218 may identify a page or pages included in the first command index, i.e., a page that is expected to be returned as completed, but is not included in the second command index, and therefore categorize the identified page as incomplete. For example, the data processing tracking module 218 may generate a delta value for the each unique identifier in the second command index by determining a difference between the page rank value and the asset-page rank value for the each unique identifier, identify a missing unique identifier at a continuity break of the generated delta values, and identify the missing unique identifier in the first command index.

In operation 817, the data processing tracking module 218 determines whether additional pages are complete. For example, the data processing tracking module 218 may continuously monitor for received signals from one or more command executing agents 232 to determine when additional pages of commands have been completed. Where additional pages are received and have been completed, the flow chat 800 returns to operation 813 by receiving a new indication and then updating the second command index with the newly received pages of commands. Where additional pages have not been received, such as not received for a predetermined amount of time, the flow chat 800 proceeds to operation 819. In operation 819, the data processing tracking module 218 stores the list of completed commands and presents on the display 216, or transmits via the communications interface 210 for presentation, a representation of the results. In some examples, the representation of the results may be or may be similar to the representation 700 illustrated in FIG. 7.

It should be understood that some operations of the flow chat 800 may be omitted, added, performed in a different order, and so forth without departing from the scope of the present disclosure. For example, the data processing tracking module 218 may present an updated representation of the results, or transmit an updated representation of the results for presentation, each time the second command index is updated with newly received completed pages of commands.

Additional Examples

Some examples herein are directed to a computer-implemented method of tracking of continuous data processing workloads, as illustrated by the flow chart 800. The method (800) includes receiving (801) a stream (301) of signals, the signals including a plurality of commands to be executed; generating (803) at least one timeslice (303, 305) in the received stream, the at least one timeslice corresponding to at least one period of time and including the plurality of commands; categorizing (805) the plurality of commands into at least one page; assigning (807) a unique identifier to the at least one page; transmitting (811) the at least one page, including the unique identifier, to a command executing agent (232); and in response to receiving an indication that the at least one page is completed, marking (815) each of the plurality of commands included in the at least one page as completed.

In some examples, the computer-implemented method further includes presenting, on a display, a representation of the marked plurality of commands as completed.

In some examples, the computer-implemented method further includes transmitting a representation of the marked plurality of commands as completed to an external device for presentation.

In some examples, the at least one command is a command to delete data or to export data.

In some examples, the plurality of commands include at least a first type of command and a second type of command, and categorizing the plurality of commands into at least one page further comprises categorizing commands included in the first type of command into a first set of pages and commands included in the second type of commands into a second set of pages.

In some examples, the at least one page is included in a plurality of pages, and the computer-implemented method further includes generating a first command index including the plurality of pages, and in response to receiving indication that at least one page of the plurality of pages is completed, generating a second command index including the completed plurality of pages.

In some examples, the first command index is a list of the plurality of pages expected to be completed, and the second command index is a list of the completed plurality of pages.

In some examples, the computer-implemented method further includes identifying a page of the plurality of pages that is included in the generated first command index but not included in the generated second command index, and categorizing the identified page as incomplete.

In some examples, the computer-implemented method further includes receiving an indication that the identified page is complete, updating the generated second command index to include the identified page, and recategorizing the identified page as complete.

In some examples, the second command index includes each unique identifier, a page rank value associated with the each unique identifier, and an asset-page rank value associated with the each unique identifier, and identifying the page of the plurality of pages as included in the generated first command index but not included in the generated second command index further comprises generating a delta value for the each unique identifier by determining a difference between the page rank value and the asset-page rank value for the each unique identifier, identifying a missing unique identifier at a continuity break of the generated delta values, and identifying the missing unique identifier in the first command index.

In some examples, assigning the unique identifier further comprises retrieving a timestamp associated with the at least one timeslice, and appending a monotonically increasing value to the retrieved timestamp.

Although described in connection with an example computing device 100 and system 200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, servers, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:

1. A computer-implemented method comprising:
   receiving, from a command source, a command to be executed;
   categorizing the command by a command type into a page by inserting the command into the page, wherein the page is specific to the command type;
   assigning a first unique identifier to the page;
   transmitting the page, including the first unique identifier, to a command executing agent;
   in response to receiving an indication that the page is executed by the command executing agent, marking the page as completed, thereby decreasing an amount of datapoints to be stored to track completion of the command;
   storing a range of completed page unique identifiers in a storage space; and
   adding the first unique identifier of the page including the command to the range of completed page unique identifiers,
   wherein storing the range of completed page unique identifiers in the storage space utilizes fewer datapoints than storing a table including a completed command and an identifier of the command source.

2. The computer-implemented method of claim 1, further comprising:
   presenting, on a display, a representation of the marked page as completed.

3. The computer-implemented method of claim 1, further comprising:
   transmitting a representation of the marked page as completed to an external device for presentation.

4. The computer-implemented method of claim 1, wherein:
   the command includes at least a first type of command and a second type of command; and
   categorizing the command into the page further comprises:
      categorizing the command included in the first type of command into a first set of pages; and
      categorizing the command included in the second type of command into a second set of pages.

5. The computer-implemented method of claim 1, wherein:

the page is included in a plurality of pages; and
the computer-implemented method further comprises:
generating a first command index including the plurality of pages; and
in response to receiving the indication that the page of the plurality of pages is executed by the command executing agent, generating a second command index including a completed page, the completed page being an executed at least one page.

6. The computer-implemented method of claim 5, wherein:
the first command index is a list of the plurality of pages expected to be completed; and
the second command index is a list of a completed plurality of pages.

7. The computer-implemented method of claim 5, further comprising:
identifying a second page of the plurality of pages that is included in the generated first command index but not included in the generated second command index; and
categorizing the identified second page as incomplete.

8. The computer-implemented method of claim 7, further comprising:
receiving a second indication that the identified second page is complete;
updating the generated second command index to include the identified second page; and
recategorizing the identified second page as complete.

9. The computer-implemented method of claim 7, wherein:
the second command index includes a second unique identifier associated with the second page, a page rank value associated with the second unique identifier, and an asset-page rank value associated with the second unique identifier; and
identifying the second page of the plurality of pages as included in the generated first command index but not included in the generated second command index further comprises:
generating a delta value for the first unique identifier and the second unique identifier by determining a difference between the page rank value and the asset-page rank value for the second unique identifier;
identifying a missing unique identifier at a continuity break of the generated delta value for the first unique identifier and the generated delta value for the second unique identifier; and
identifying the missing unique identifier in the first command index.

10. The computer-implemented method of claim 1, wherein assigning the first unique identifier further comprises:
generating a timeslice, the timeslice corresponding to a period of time and including the command;
retrieving a timestamp associated with the timeslice; and
appending a monotonically increasing value to the retrieved timestamp.

11. A system comprising:
a memory storing instructions that are executable by a processor;
the processor configured to execute the instructions stored on the memory; and
a data processing tracking module, implemented on the processor, configured to:
receive, from a plurality of command sources, a plurality of commands to be executed;
categorize the plurality of commands by a command type into at least one page by inserting each command of the plurality of commands into the at least one page, wherein the at least one page is specific to the command type;
assign a unique identifier to the at least one page;
transmit the at least one page, including the unique identifier, to a command executing agent;
in response to receiving an indication that the at least one page is executed by the command executing agent, mark each page included in the at least one page as completed, thereby decreasing an amount of datapoints to be stored to track completion of the plurality of commands;
store a range of completed page unique identifiers in a storage space; and
add the unique identifier of each page of the at least one page to the range of completed page unique identifiers,
wherein storing the range of completed page unique identifiers in the storage space utilizes fewer datapoints than storing a table including a completed command and an identifier of each command source of the plurality of command sources.

12. The system of claim 11, wherein:
the plurality of commands includes at least a first type of command and a second type of command; and
to categorize the plurality of commands into at least one page, the data processing tracking module is further configured to:
categorize each command of the plurality of commands included in the first type of command into a first set of pages; and
categorize each command of the plurality of commands included in the second type of command into a second set of pages.

13. The system of claim 11, wherein:
the at least one page is included in a plurality of pages; and
the data processing tracking module is further configured to:
generate a first command index including the plurality of pages; and
in response to receiving the indication that the at least one page of the plurality of pages is executed by the command executing agent, generating a second command index including a completed at least one page, the completed at least one page being an executed at least one page.

14. The system of claim 13, wherein:
the first command index is a list of the plurality of pages expected to be completed; and
the second command index is a list of a completed plurality of pages.

15. The system of claim 13, wherein the data processing tracking module is further configured to:
identify a second page of the plurality of pages that is included in the generated first command index but not included in the generated second command index; and
categorize the identified second page as incomplete.

16. The system of claim 15, wherein the data processing tracking module is further configured to:
receive a second indication that the identified second page is complete;
update the generated second command index to include the identified second page; and
recategorize the identified second page as complete.

17. The system of claim 15, wherein:
the second command index includes a second unique identifier associated with the second page, a page rank value associated with the second unique identifier, and an asset-page rank value associated with the second unique identifier; and
to identify the second page of the plurality of pages as included in the generated first command index but not included in the generated second command index, the data processing tracking module is further configured to:
generate a delta value for the unique identifier and the second unique identifier by determining a difference between the page rank value and the asset-page rank value for the second unique identifier;
identify a missing unique identifier at a continuity break of the generated delta value for the unique identifier and the generated delta value for the second unique identifier; and
identify the missing unique identifier in the first command index.

18. The system of claim 11, wherein, to assign the unique identifier, the data processing tracking module is further configured to:
generate at least one timeslice, each timeslice of the at least one timeslice corresponding to a period of time and including the plurality of commands;
retrieve a timestamp associated with the at least one timeslice; and
append a monotonically increasing value to the retrieved timestamp.

19. A computer-storage memory device embodied with executable instructions that, when executed by a processor, cause the processor to:
receive, from a plurality of command sources, a plurality of commands to be executed;
categorize the plurality of commands by a command type by inserting each command of the plurality of commands into at least one page, wherein the at least one page is specific to the command type;
assign a unique identifier to the at least one page;
transmit the at least one page, including the unique identifier, to a command executing agent; and
in response to receiving an indication that the at least one page is executed by the command executing agent, mark each page included in the at least one page as completed, thereby decreasing an amount of datapoints to be stored to track completion of the plurality of commands;
store a range of completed page unique identifiers in a storage space; and
add the unique identifier of each page of the at least one page to the range of completed page unique identifiers,
wherein storing the range of completed page unique identifiers in the storage space utilizes fewer datapoints than storing a table including a completed command and an identifier of each command source of the plurality of command sources.

20. The computer-storage memory device of claim 19, wherein the storage space has a storage size equal to a product of M, P, and Q,
M being a number of the plurality of command sources,
P being an average number of non-continuous completed pages per each command source in the range of completed page unique identifiers, and
Q being a size of expressing P in bytes.

* * * * *